United States Patent [19]
Hasegawa et al.

[11] Patent Number: 5,918,587
[45] Date of Patent: *Jul. 6, 1999

[54] METHOD OF PRODUCING SLICES

[75] Inventors: Fumihiko Hasegawa; Hitoshi Misaka; Toshihiro Tsuchiya, all of Nishigou-mura, Japan

[73] Assignee: Shin-Etsu Handotai Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,190

[22] Filed: Feb. 28, 1996

[30] Foreign Application Priority Data

Feb. 28, 1995 [JP] Japan ................................. 7-065083
Jun. 30, 1995 [JP] Japan ................................. 7-187872

[51] Int. Cl.$^6$ ........................................................ B26F 3/02
[52] U.S. Cl. ........................................ 125/23.01; 225/93.5
[58] Field of Search ........................... 125/13.01, 13.02, 125/23.01, 24; 225/96.5, 93.5, 2, 4, 5

[56] References Cited

U.S. PATENT DOCUMENTS

| | | | |
|---|---|---|---|
| 3,845,895 | 11/1974 | Nakahara | 225/93.5 |
| 3,901,423 | 8/1975 | Hillberry et al. | 125/23.01 |
| 3,958,732 | 5/1976 | Aoyama et al. | |
| 4,331,452 | 5/1982 | Causey et al. | |
| 5,024,207 | 6/1991 | Harbarger et al. | 451/53 |
| 5,394,505 | 2/1995 | Bidare | 225/93.5 |

FOREIGN PATENT DOCUMENTS

| | | |
|---|---|---|
| 3131485 | 2/1983 | Germany. |
| 3131491 | 2/1983 | Germany. |
| 3403826 | 8/1985 | Germany. |
| 3409937 | 9/1985 | Germany. |
| 3-142928 | 6/1991 | Japan. |
| 3-239507 | 10/1991 | Japan. |
| 6-155263 | 6/1994 | Japan. |
| 925479 | 5/1982 | Russian Federation ............... 225/93.5 |
| 409886 | 10/1966 | Switzerland. |
| 938917 | 10/1963 | United Kingdom. |

OTHER PUBLICATIONS

Chandrasekar et al., "Precision Crack–off of Brittle Materials", *Journal of Engineering for Industry*, vol. 110 (May 1988) pp. 187–191.

Tanaka, "Lateral Pressure Cutting Method", *Journal of the Precision Machine Engineer's Association of Japan*, vol. 60, No. 2 (1994) pp. 192–195.

*Primary Examiner*—Eileen P. Morgan
*Attorney, Agent, or Firm*—Evenson, McKeown, Edwards & Lenahan, P.L.L.C.

[57] ABSTRACT

The invention seeks to provide a method of producing slices, such as semiconductor wafers, from a rod-like ingot, which does not require any cutting margin for slicing so that less material is consumed, and also is free from warping or denatured layer of the slices, as well as being free from operating environment deterioration with high quality. A cylindrical ingot is obtained by cutting or grinding the outer periphery of a rod-like ingot, and it is then formed with a plurality of annular grooves at a predetermined pitch in its longitudinal direction to obtain a cylindrical work with annular grooves. The work is then severed in the section defined by the bottom of each annular groove by generating a stress in excess of the rupture strength of the slice in the groove.

After the heating of the cylindrical work with annular grooves, the under-process end face of the work is suitably cooled quickly by cooling water jet from a jet nozzle from the outer periphery toward the center of the work.

10 Claims, 5 Drawing Sheets

METHOD OF PRODUCING SLICES

BACKGROUND OF THE INVENTION

1. Field of the Invention

The present invention relates to a method of producing slices, such as semiconductor wafers, by severing a rod-like ingot of a semiconductor material without use of any cutting means such as an inner peripheral blade slicer or a wire saw.

2. Description of the Prior Art

Among methods of obtaining semiconductor wafers or like slices from a rod-like ingot of silicon single crystal, are one as disclosed in Japanese Laid-Open Patent Publication No. 3-142928 (herein referred to as first prior art) in which the ingot is sliced into wafers with a thin doughnut-like inner peripheral blade with fine grindstone particles secured to the inner periphery, and one in which a wire saw is used for slicing the ingot.

As the method using the wire saw, various processes have been proposed and adapted for general use. One such method is disclosed in Japanese Laid-Open Patent Publication No. 3-239507 (herein referred to second prior art).

In this method of slicing using the wire saw, grindstone particles are added to a cutting solution for use as free grindstone particles to slice the ingot into wafers with the pH of the process solution set to 7.5 to 9.0.

In the above first and second prior arts, however, a cutting margin is necessary. When slicing the ingot into wafers, the cutting margin is wasted, thus increasing the consumption of the material (i.e., ingot) and causing a cost increase.

Particularly, with the inner peripheral blade slicer pertaining to the first prior art, the wafers obtained by slicing have great warping or denatured layer. This is improved in the case of the wire saw pertaining to the second prior art. Nevertheless, the occurence of warping is inevitable. In addition, because of the use of grindstone particles, the wafers obtained by slicing have denatured layer which is generated by the processing. It is necessary, however, that the product has high degree of flatness and is free from strain. Therefore, the denatured layer has to be removed in a fast-treatment.

The slicing method using the inner peripheral blade as in the first prior art further has a problem that the operating environment is deteriorated by scattering of the liquid coolant used in the slicing operation. The second prior art using the wire saw has like scattering problem because of the use of a cutting solution containing free grindstone particles.

Aside from the processes of direct slicing of ingot using a blade as in the first and second prior arts noted above, a side pressure slicing process (third prior art) has recently been developed (as disclosed in Journal of the Precision Machine Engineer's association of Japan, Vol. 60, No. 2, 1994), in which hard and fragile materials, typically glass or ceramics, are hydraulically sliced with an oil.

Specifically, in the side pressure slicing process, use is made of an internal stress generated in a work by applying pressure side-wise of the work. The principles underlying this process will be described with reference to FIG. 5. Reference numeral 50 designates a cylindrical ingot (i.e., work) to be sliced, and reference numeral 51 designates a pressure vessel, in which the ingot 50 is supported for axial movement by O-rings 52 fitted inside the vessel. A working fluid feed port 51a externally extends into the vessel 51 with the ingot 50 disposed therein.

Figure 5:
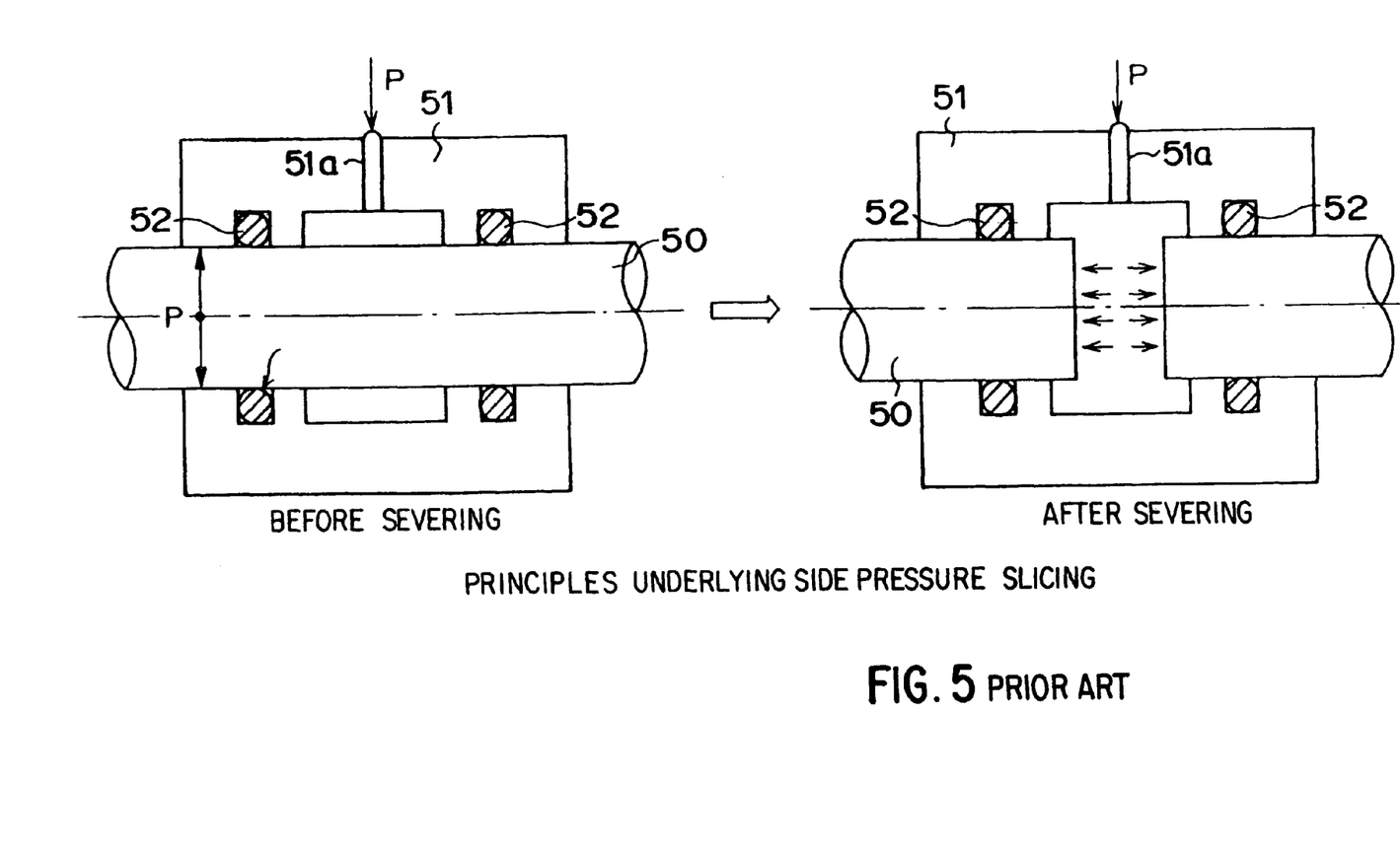
FIG. 5 is a view showing principles underlying a side pressure slicing process in the prior art.

In this apparatus, pressure P is applied to the inside of the pressure vessel 51 from the working fluid feed port 51a in a state that the leakage of the working fluid is prevented by the two O-rings 52. The ingot 50 receives the applied side pressure P between the two O-rings 52 while its ends are free. Upon reaching of a certain pressure value by the side pressure P, severing takes place momentarily in a section of the ingot 50.

This side pressure slicing process can substantially preclude the problems in the slicing processes using the slicing apparatuses pertaining to the first and second prior arts. However, the ingot 50 is severed at its lowest internal stress position between the O-rings 52 in the pressure vessel 51. This means that it is impossible to determine the position, at which the severing takes place. This is unsuitable for the production of slices having a uniform thickness.

SUMMARY OF THE INVENTION

An object of the invention is to provide a method of producing slices, which does not require any cutting margin for obtaining a slice so that less material is consumed, is free from warping of slices or generation of denatured layer of or residual strain in the slices, and is free from deterioration of the operating environment.

Another object of the invention is to provide a method of producing slices, which permits slices, particularly semiconductor wafers, having a predetermined thickness to be obtained accurately, reliably and in a contact-free state.

The above objects of the invention are attained by a method of producing slices, in which, like the third prior art noted above, the severing is effected by increasing the internal stress to be beyond the rupture strength, and the method features the following.

One feature of the invention resides in cutting or grinding the outer periphery of the rod-like ingot to a fixed diameter in the axial direction, forming the machined rod-like ingot with a plurality of annular grooves at a predetermined pitch in the longitudinal direction of the ingot to form a cylindrical work with annular grooves, and generating a stress in excess of the rupture strength of the ingot groove bottom diameter in each annular groove, thereby severing the ingot to obtain a slice (or wafer) along a section defined by the bottom of each annular groove.

Another feature of the invention resides in that the stress in excess of the rupture strength is generated in a process in which a thermal shock is exerted to each annular groove, a process in which a shearing force is applied to each annular groove, a process in which pulling force is applied to the ingot in the longitudinal direction thereof, or a combination of some of these processes.

A further feature of the invention resides in that the stress in excess of the rupture strength, for severing the ingot to obtain a slice, is generated in a process, in which the outer periphery of the machined rod-like ingot with annular grooves is heated, followed by quickly cooling the under-process end face of the ingot by blowing cooling water against the end face from the edge toward the center thereof.

A yet further feature of the invention resides in that the stress in excess of the rupture strength, for severing the ingot to obtain a slice, is generated in a process, in which, after the heating of the ingot, the under-process end face of the ingot is quickly cooled down by blowing cooling water against the end face from a cooling water jet nozzle disposed coaxially with the ingot progressively from the edge toward the center of the end face with a movement of the jet nozzle caused from a position of a predetermined distance from the under-process end face in the axial direction of the ingot.

The method of producing slices according to the invention will now be described step by step.

The outer periphery of a rod-like ingot of a semiconductor material, for instance, is ground with a cylindrical grinder or likewise finished to obtain a cylindrical ingot having a fixed diameter in the axial direction.

Thus, the rupture strength in the direction of section of the ingot is fixed.

Then, the outer periphery of the cylindrical ingot is formed with a plurality of annular grooves at a fixed pitch in the longitudinal direction, thus obtaining a cylindrical work, which has annular grooves for reducing the rupture strength at the location of the grooves.

Then the cylindrical work with annular grooves is mounted in equipment for providing thermal shock, or a equipment for providing a shearing or pulling force or a combination of these equipments.

Then, a stress in excess of the rupture strength of the groove bottom diameter is provided to each annular groove of the cylindrical work by means of:

(1) exerting a thermal shock to the annular groove;

(2) applying a shearing force to the annular groove; or (3) applying a pulling force to the cylindrical work in the longitudinal direction thereof.

In this way, the cylindrical work is severed at a time in the direction of the section defined by the annular groove.

In the above specific process of generating a stress in excess of the rupture strength in the cylindrical work with annular grooves, obtained from a cylindrical ingot by forming the periphery thereof with annular grooves, the periphery of the cylindrical work is heated by an electric heating coil or like heating means, and then the under-process end face of the cylindrical work is quickly cooled down by blowing cooling water conically against the end face from a cooling water jet nozzle disposed coaxially with the ingot progressively from the edge toward the center of the end face with a movement of the jet nozzle caused in the axial direction of the ingot, thereby generating a high stress to sever the work quickly and obtain a slice.

The slicing method as shown requires neither a cutting margin for such a tool as an inner peripheral blade or a wire saw in the prior art nor cutting by the tool. The slice that is obtained is thus free from warping due to severing or cutting or any denatured layer or residual strain that might otherwise be generated in the processing. Besides, in the method neither liquid coolant nor cutting solution is used, thus ensuring satisfactory operating environments.

Unlike the side pressure slicing method in the prior art, the ingot is formed with annular grooves in order to reduce the rupture strength at the location of the grooves, which permits accurate production of wafers having a predetermined thickness.

Since the diameter of the ingot is fixed prior to the formation of annular grooves, the possibility of generation of a rupture in a portion other than the annular grooves can be perfectly eliminated.

The slicing method according to the invention, unlike the third prior art (i.e., side pressure slicing method using hydraulic pressure as shown in FIG. 5), makes use of thermal shock or shearing or pulling force, and this means that it is possible to generate the rupture stress with a simple construction.

Particularly, with thermal shock it is possible to generate stress locally only in the grooves, so that more accurate rupture severing can be obtained.

The provision of thermal shock to the ingot also provides heat thereto, and it can also effect annealing.

In a specific process of applying a stress in excess of the rupture strength, heat load by repeated heating and cooling is provided concentrically in the groove part adjacent the slice take-out side (under-process) end face of the cylindrical work with annular grooves, and it can be shifted from the periphery to the center of the work by moving the cooling water jet nozzle. By so doing, a high stress is generated in the groove bottom to generate a fissure therein, the fissure proceeding from the edge toward the center to bring about rupture in the entire section. It is thus possible to produce slices at a high processing speed.

Moreover, it is possible to dispense with an after-process of chamfering or simplify a chamfering step by forming the annular grooves such that they have chamfered portions on the opposite side surfaces.

The invention is particularly effective when applied to the production of semiconductor wafers from a rod-like ingot of a semiconductor material. The ingot may be either single crystal or polycrystalline.

DETAILED DESCRIPTION OF THE PREFERRED EMBODIMENT

An embodiment of the invention will now be described in detail with reference to the drawings. Unless particularly noted, the sizes, materials, shapes and relative dispositions of constituent parts described in the embodiment, are by no means limitative but mere examples.

Figure 1A:
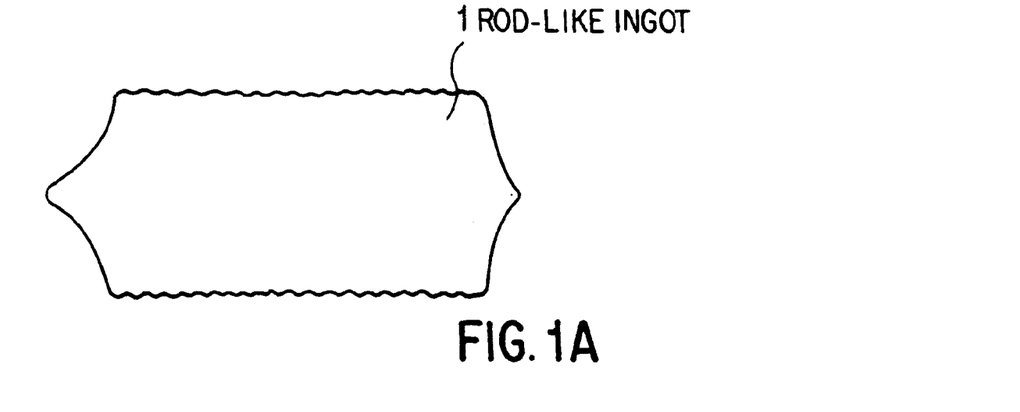
FIGS. 1A to 1C are views showing a process of slicing to produce semiconductor wafers concerning a first and a second embodiment of the invention.
Figure 1B:
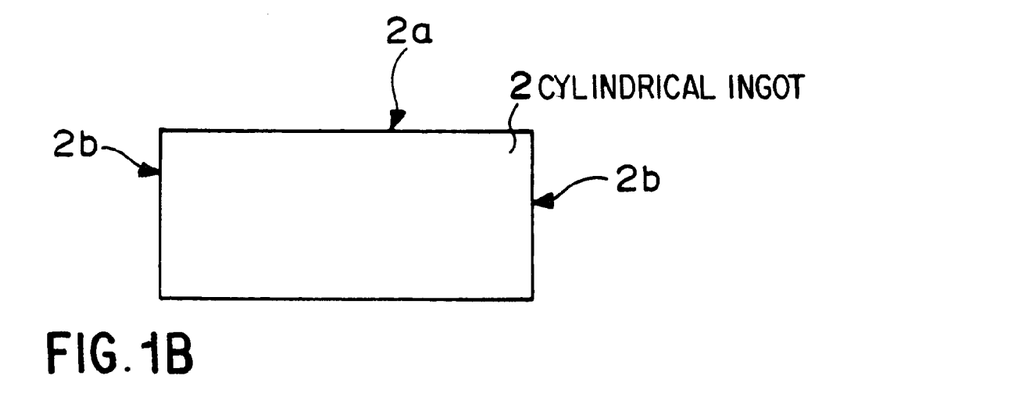
Figure 1C:
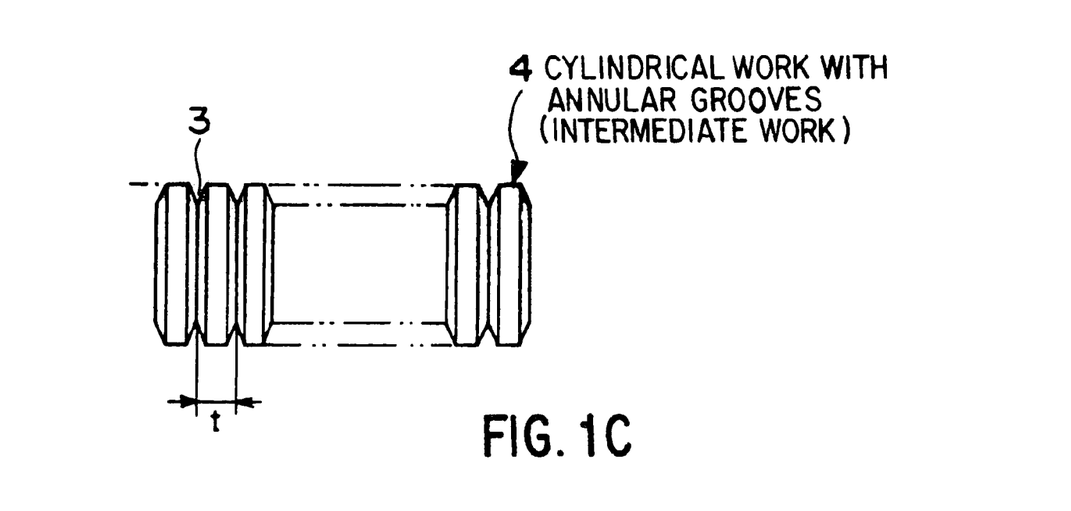
Figure 2:
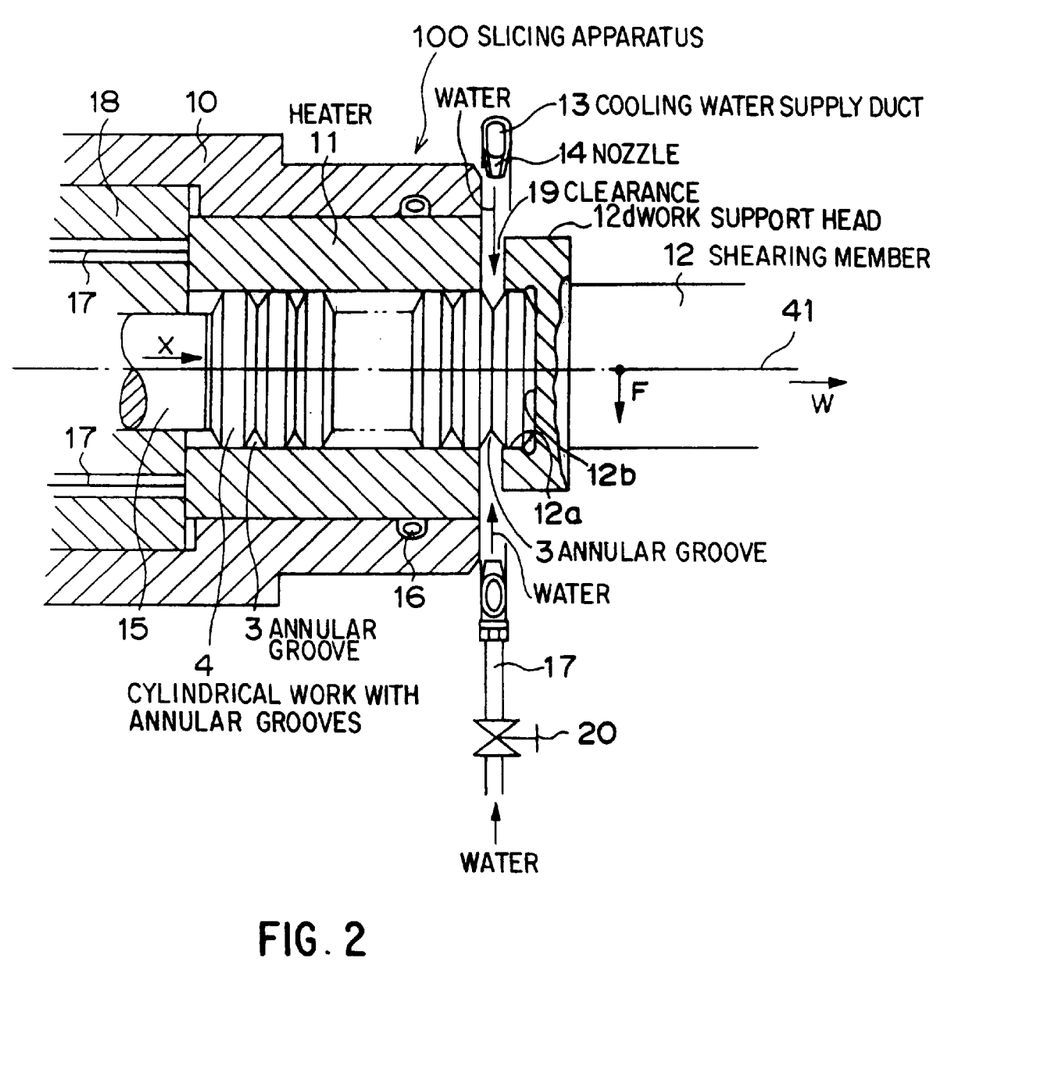
FIG. 2 is a fragmentary sectional view showing a slicing apparatus concerning the first embodiment of the invention.

FIGS. 1(A) to 1(C) are views illustrating a process as an embodiment of the invention for cutting out thin discs, such as semiconductor wafers, from a rod-like ingot of semiconductor material. FIG. 2 is a fragmentary sectional view showing a slicing apparatus concerning a first embodiment of the invention.

FIGS. 1A to 1C show a process of obtaining an intermediate work with peripheral grooves from a rod-Like silicon single crystal ingot.

FIG. 1A shows a rod-like ingot 1 of silicon single crystal raised from fused silicon.

The outer periphery 2a and end faces 2b of the rod-like are ground using a grinder, such as a cylindrical grinder, to obtain a cylindrical ingot 2 having a smoothly finished surface and having a fixed diameter in the axial direction, as shown in FIG. 1B.

The outer periphery of the cylindrical ingot 2, is then formed with a number of annular grooves 3 in a row in its longitudinal direction of the ingot 2 using a bite or a grindstone to obtain a cylindrical work 4 with grooves as shown in FIG. 1C.

The pitch t of the annular grooves 3 is determined with reference to the thickness of slices that are finally obtained.

The annular grooves 3 are sufficiently wide to bring about stress concentration in the neighborhood of their bottom. If their width is excessive, an after-process of their removal is necessary.

The annular grooves 3 are suitably V-shaped as shown in FIG. 1C in order to provide a chamfering function in an after-process and facilitate accurate severing at the grooves.

FIG. 2 is a view showing a slicing apparatus 100 concerning a first embodiment of the invention for carrying out a next slicing step with thermal shock, severing force or pulling force.

In FIG. 2, reference numeral 10 designates a casing, and reference numeral 11 designates a cylindrical heater fitted in the casing 10. The cylindrical work 4 with annular grooves, obtained in the groove formation step shown in FIG. 1C, is slidably fitted in the heater 11.

Reference numeral 16 designates an O-ring which is fitted as a seal on the heater 11.

The heater 11 is energized via a lead conductor 17 to be elevated in temperature.

Reference numeral 12 designates a shearing member, which has an end face formed with a recess 12a in which one groove pitch portion of the cylindrical work 4 with annular grooves is fitted. After the cylindrical work 4 is fitted in the recess 12a, its end and the bottom 12b of the recess 12a are temporarily bonded together with adhesive in order to prevent detachment of the work 4.

The adhesive used is such a material that it is finally separated and removed in a heating step to be described later to permit the resultant slice to be readily taken out from the recess 12a in an after-process.

The shearing member 12 has a work support head 12d which can be heated by heating means (not shown) and also is reciprocal orthogonally (i.e., in directions normal to the axis 41 of the cylindrical work 4 with annular grooves) for generating a shearing force F as shown in FIG. 2.

Reference numeral 15 designates a feed spindle, which is reciprocally fitted in the casing 18 and displaced in the direction of arrow X in FIG. 2 to feed the cylindrical work 4 with annular grooves toward the shearing member 12.

Reference numeral 13 designates a water supply duct used for providing thermal shock. The duct 13 has an annular water chamber, and cooling water is supplied to the duct 13 from a water pipe 17.

Reference numeral 14 designates a water jet nozzle provided in the form of a slit or as a plurality of uniformly spaced-apart divisions along the circumference of the water supply duct 13. The water jet nozzle 14 is open to a clearance 19 defined between the end face of the casing 10 and heater 11 and the corresponding end face of the shearing member 12.

A plurality of slicing apparatuses 100 having the construction as described are arranged in a juxtaposed fashion, the cylindrical work 4 with annular grooves, obtained in the previous FIG. 1C step, is sliced by each apparatus 100 in a procedure as described in the following.

First, the cylindrical work 4 is fitted in the heater 11 and positioned by the feed spindle 15 such that its leading end annular groove 3 is positioned in the center of the recess 19 as shown in FIG. 2.

Then, the work 4 is elevated in temperature to a desired high temperature, for instance 500 to 1,000° C. corresponding to the annealing temperature, by energizing and heating the heater 11 while also heating the work support head 12d with heating means (not shown).

Then, the annular groove 3 in the clearance 19 is quickly cooled down by opening an on-off valve 20 on the water supply duct 13 and thus causing water to be issued from the nozzle 14 toward the annular groove 3.

The high temperature heating and the subsequent quick cooling of the annular groove 4 of the cylindrical work 4 produces a thermal shock, and an internal stress in excess of the rupture strength of silicon as the material of the work 4, is generated in the bottom of the annular groove 3 because of a high stress concentration effect of the groove bottom. As a result, the cylindrical work 4 is severed at a time in a plane normal to the axis 41 of the work 4 with the quickly cooled-down groove bottom as a notch.

By providing a shearing force F with the movement of the shearing member 12 caused in a direction normal to the axis 41 simultaneously with and independently of the above thermal shock, the work 4 can be severed more readily and at a time in the section of the annular groove 3.

Thereafter, the shearing member 12 is moved in the direction of arrow W in FIG. 2, for instance, and the slice thus obtained is removed from the shearing member 12 by separating the adhesive.

The slice thus obtained by severing the work 4 after heating thereof with the heater 11, is left to cool down until completion of the take-out step. During this step, such thermal processes as donor removal may be carried out.

The semiconductor material which is suitable for the above slicing process, is required to have a character that it can be severed at one time, and the invention is applicable not only to the single crystal silicon as in this embodiment, but also to polycrystalline silicon ingots.

The above sequence of operations from the severing of the cylindrical work 4 with annular grooves until the take-out of the slice, is carried out continuously with a plurality of slicing apparatuses 100 with the predetermined interval of time for each apparatus.

As the process of slicing the work 4 with annular grooves, it is possible to adopt, in addition to the severing of the work 4 with the thermal shock and shearing force, a process in which a pulling force is applied to the work 4 from one end thereof in the direction W of the axis 41 by securing the other end of the work in position to generate a tensile force exceeding the rupture strength of the work material (i.e., silicon) in the annular groove 3, whereby the work is severed at a time in the section of the annular groove 3.

The slice obtained in the above way from the cylindrical work 4 with annular grooves in the above process, is subsequently lapped and etched and then subjected to predetermined well-known finish processes, such as chamfering with buffing, rear surface treatment, front surface polishing, etc., thus obtaining the final product.

It is possible to omit the chamfering process by preliminarily making the surfaces of the V-shaped annular groove 3 to be of a chamfered shape.

Figure 3:
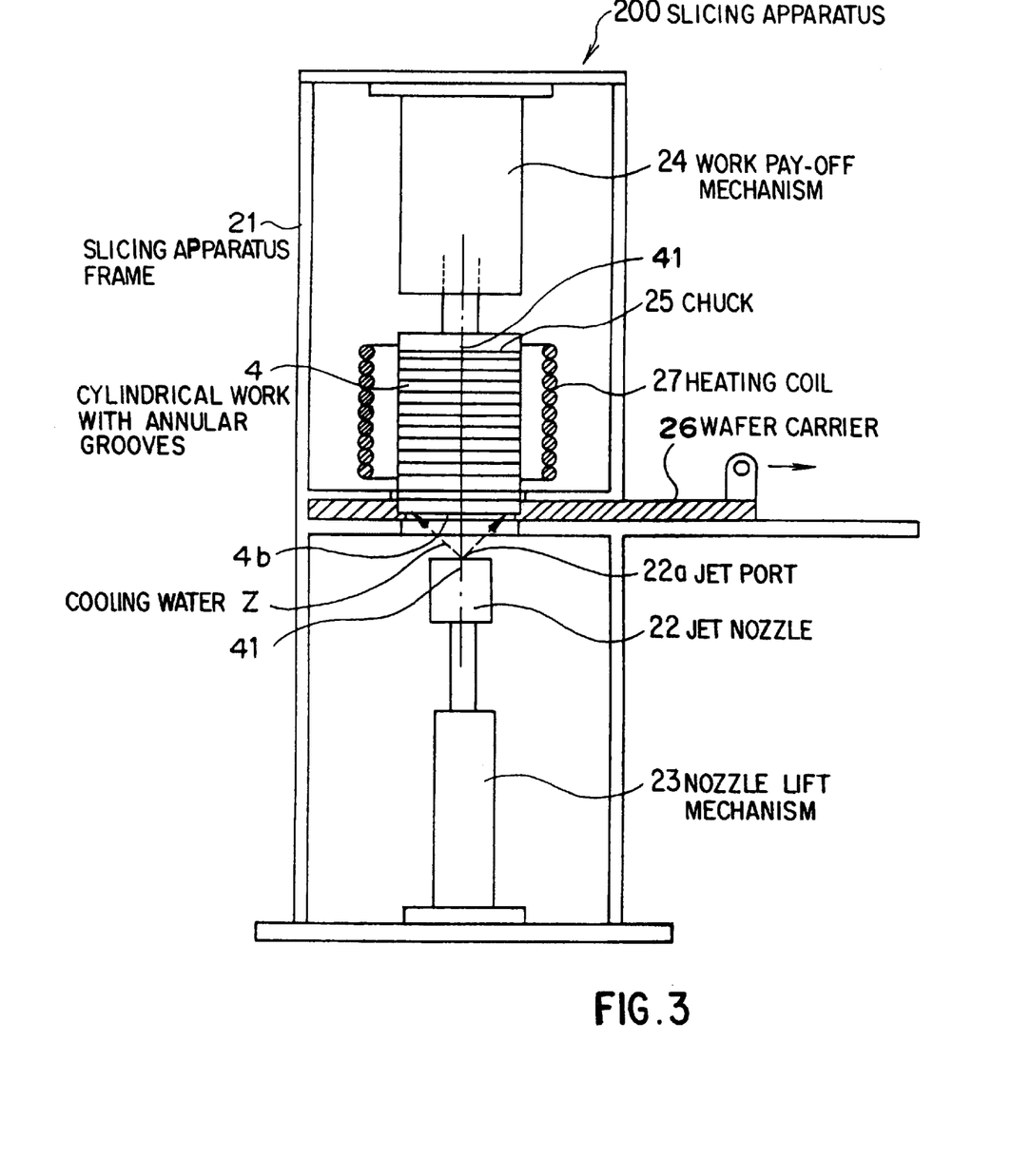
FIG. 3 is an elevational view showing a slicing apparatus concerning a second embodiment of the invention.
Figure 4:
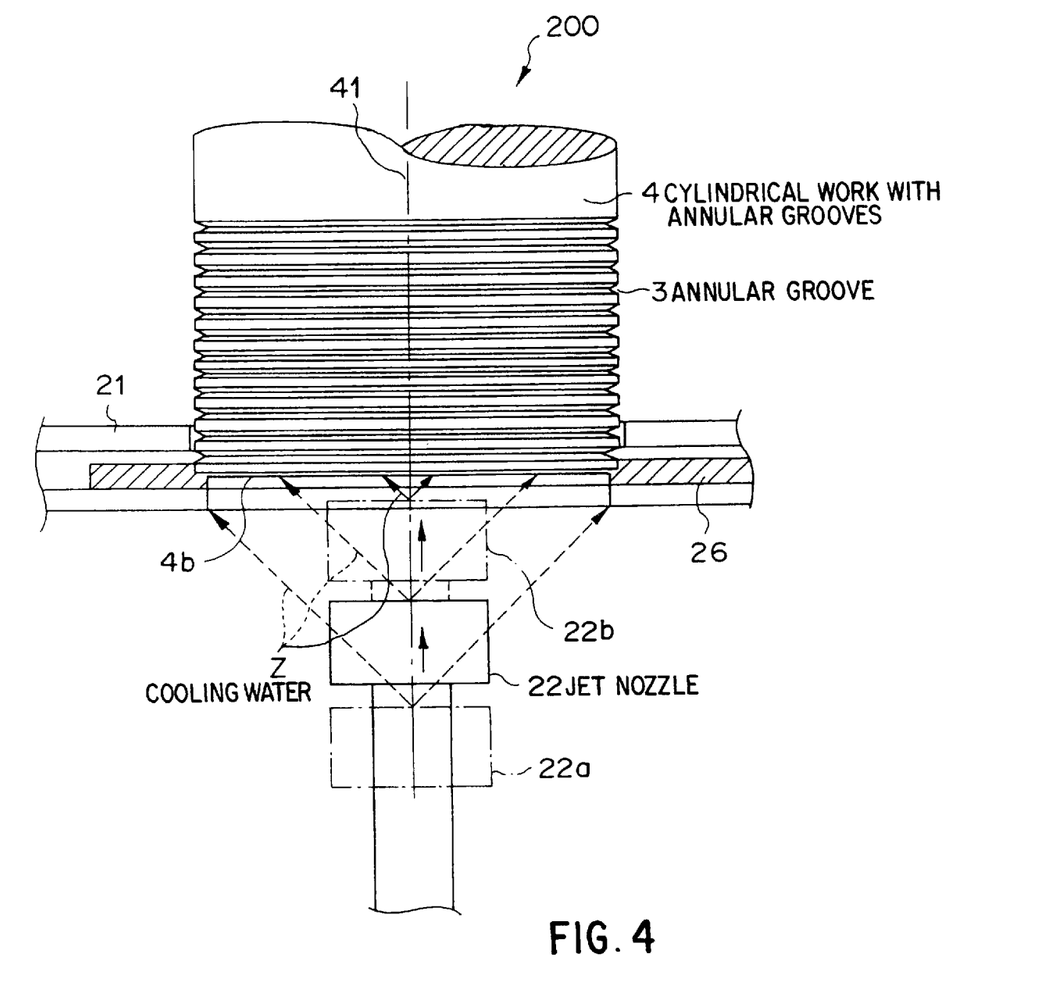
FIG. 4 is a fragmentary sectional view showing an ingot slicing part in the second embodiment of the invention.

FIGS. 3 and 4 show an ingot slicing apparatus 200 concerning a second embodiment of the invention.

In FIGS. 3 and 4, reference numeral 4 designates a cylindrical work with annular grooves, obtained by forming annular grooves in the periphery of an ingot, as shown in FIG. 1C. Reference numeral 21 is a slicing apparatus, reference numeral 24 designates a work pay-off mechanism, and reference numeral 25 designates a work securing chuck of the work pay-off mechanism 24. The cylindrical work 4 is mounted in a predetermined processing position in the apparatus 21 such that it is attached to the underside of the chuck 25 of the work pay-off mechanism 24.

Reference numeral 27 is a heating coil (i.e., electric heating coil) surrounding the work 4 over the entire length thereof, and reference numeral 26 is a wafer carrier for taking out slices (i.e., wafers) obtained by severing.

Reference numeral 22 designates a cooling water jet nozzle disposed beneath the cylindrical work 4, and reference numeral 23 a nozzle lift mechanism for vertically driving the jet nozzle 22.

The jet nozzle 22 is disposed such that it is coaxial with the axis 41 of the cylindrical work 4 with annular grooves (or may be slightly deviated from the axis 41) and, as described before, can be moved in the axial direction (i.e., vertical direction) of the work 4. It has a radially central jet port 22a, from which cooling water Z is sprayed.

As shown in FIGS. 3 and 4, cooling water Z jets out conically from the jet port 22a.

The process of slicing the cylindrical work 4 with annular grooves using the slicing apparatus 200 shown in FIGS. 3 and 4, will now be described.

The work 4 is mounted in the slicing apparatus frame 21 in a predetermined position thereof by operating the work pay-off mechanism 24, and it is secured in position with the chuck 25.

Then, by energizing the heating coil 27 the work 4 is heated from its outer periphery up to a temperature approximately corresponding to the annealing temperature of the work (for instance 500 to 1,000° C. in case when the work 4 is for silicon wafers).

Then, cooling water Z is sprayed conically from beneath the work 4, i.e., from the jet port 22a of the jet nozzle 22 to be blown against the under-process end face of the work 4.

In this case, the nozzle lift mechanism 23 first sets the jet nozzle 22 to a position spaced apart from the work 4 such that cooling water Z is blown against an edge portion (i.e., annular groove portion 3) of the under-process end face of the work 4, and then raises the nozzle lift mechanism 23 jetting out cooling water Z from this position to cause shift of the point of blow-out of cooling water Z against the work 4 toward the radial center thereof.

As the cooling and heating as described above are repeated, a fissure is generated in the annular groove 3 of the work 4. As the jet nozzle 22 is caused to approach the work 4, as shown by 22a to 22b in FIG. 4, the point of blow-out of the jet conical and cooling water Z against the end face 4b of the work 4 is shifted from the annular groove 3 adjacent the edge of the end face 4b toward the center thereof. This shift of the blow-out point causes corresponding shift of the high stress generation part from the edge toward the center of the end face 4b. Eventually, the stress in the entire section inclusive of the annular groove 3 exceeds the rupture strength, whereupon the slice portion is severed at one time to provide a new under-process end face of the work 4.

As shown above, in this embodiment the point of blow-out of cooling water Z against the cylindrical work 4 with annular grooves is shifted from the outer periphery toward the center of the work 4 by moving the jet nozzle 22 in the axial direction of the work 4. The entire section thus can be quickly made to be in a high stress state, and it is possible to Produce slices at a high processing speed.

In this embodiment, a cylindrical ingot is formed in the outer periphery thereof with a plurality of annular grooves at a predetermined pitch in the longitudinal direction Of the ingot, and the ingot is severed in the section defined by the bottom of each annular groove by generating a stress in excess of the rupture strength of the groove bottom diameter to the groove bottom. Thus, a cutting margin in case of using the conventional inner peripheral blade or wire is unnecessary, and also the material can be saved, thus permitting cost reduction.

The freedom from cutting with any tool has another merit that homogeneous slices are obtainable with no or very slight, if any, warping or generation of denatured layer like that which may generated by cutting or grinding in the prior art process.

A further merit is that there is no need of using any liquid coolant or cutting solution for suspending grindstone particles. In other words, there is no possibility of deterioration of the operating environment by the scattering of such solutions, and it is possible to produce slices, such as semiconductor wafers, in satisfactory operating environments.

As a process of generating an internal stress in excess of the rupture strength, the ingot with annular grooves which has been heated by exerting thermal shock to it and subsequently water cooled, may finally be slowly air cooled, whereby an annealing effect can be provided on the slices such as wafers obtained from the ingot, thus permitting omission of the after-process of thermal treatment of wafers.

The instant embodiment, unlike the side pressure severing using oil hydraulic pressure as shown in FIG. 5, is based on thermal shock or shearing or pulling force, and it is possible to generate the rupture stress with a simple construction.

Particularly, in the case of the thermal shock it is possible to generate stress locally only, i.e., only in the groove, and it is possible to obtain more accurate rupture severing.

In addition, the thermal shock can also have an effect of annealing because it provides heat to the ingot.

As described above, the stress in excess of the rupture strength for obtaining a slice by rupture severing the cylindrical work with annular grooves, obtained by forming the annular grooves in an ingot, may be generated by heating the outer periphery of the work and then blowing cooling water for quick cooling on the end face of the work progressively from the edge toward the center of the end face. Alternatively, after the heating of the work, the water cooling jet nozzle which is disposed coaxially with the work, is moved from a position at a predetermined distance from the end face of the work in the axial direction of the work to shift the point of blow-out of cooing water against the end face of the work from the peripheral groove toward the center of the end face. By causing the shift of the blow-out point in this way, the rupture severing with thermal shock can be obtained quickly. The rupture severing surface thus obtained is smooth because the cooling is made not locally but over the entire section.

Production of slices is thus possible at a high processing speed.

What is claimed is:

1. A method of producing slices of a semiconductor material having a defined thickness by severing a rod of said material without any cutting tool, said method comprising the steps of:

machining the rod to a cylindrical configuration having an axis, an outer periphery with a uniform diameter and first and second axial end faces;

forming a plurality of annular grooves having a bottom in the outer periphery of the rod, said grooves being spaced apart a distance corresponding to the thickness of the slices to be produced;

heating a portion of the outer periphery of the rod having annular grooves formed therein; and     quickly cooling the rod by blowing a cooling fluid into one of the annular grooves to produce a thermal shock which severs the rod along a plane defined by the bottom of the groove into which the cooling fluid is blown.

2. A method according to claim 1, further comprising applying a shearing force perpendicular to the axis of the rod.

3. A method according to claim 2, wherein the shearing force is applied simultaneously with the thermal stress.

4. A method according to claim 3, wherein the shearing force is applied by moving an axial end face of the rod adjacent the groove in which thermal stress is being applied perpendicular to the axis of the rod.

5. A method according to claim 1, further comprising applying a shearing force perpendicular to the axis of the rod.

6. A method according to claim 5, wherein the shearing force is applied simultaneously with the thermal stress.

7. A method according to claim 6, wherein the shearing force is applied by moving an axial end face of the rod adjacent the groove in which thermal stress is being applied perpendicular to the axis of the rod.

8. A method of producing slices of a semiconductor material having a defined thickness by severing a rod of said material without any cutting tool, said method comprising the steps of:

machining the rod to a cylindrical configuration having an axis, an outer periphery with a uniform diameter and first and second axial end faces;

forming a plurality of annular grooves having a bottom in the outer periphery of the rod, said grooves being spaced apart a distance corresponding to the thickness of the slices to be produced;

heating the rod in the vicinity of a groove adjacent one end face; and quickly cooling the rod by blowing a cooling fluid against said one end face to produce a thermal shock which severs the rod along a plane defined by the bottom of the groove adjacent said one end face.

9. A method according to claim 8, wherein the cooling fluid is water directed by a water jet nozzle against said one end face.

10. A method according to claim 9, wherein said water jet nozzle directs a conical spray of water against said one end face, and said nozzle is movable toward said one end face to cause the water spray to move from the periphery toward the center of said one end face.

* * * * *